US011959837B2

(12) United States Patent
Fournel et al.

(10) Patent No.: US 11,959,837 B2
(45) Date of Patent: Apr. 16, 2024

(54) DEVICE FOR COLLECTING PARTICLES OR MICROORGANISMS

(71) Applicant: BERTIN TECHNOLOGIES, Montigny le Bretonneux (FR)

(72) Inventors: Guillaume Fournel, Versailles (FR); Laure Duvauchelle, Viroflay (FR)

(73) Assignee: BERTIN TECHNOLOGIES, Montigny le Bretonneux (FR)

( * ) Notice: Subject to any disclaimer, the term of this patent is extended or adjusted under 35 U.S.C. 154(b) by 730 days.

(21) Appl. No.: 17/052,895

(22) PCT Filed: May 3, 2019

(86) PCT No.: PCT/EP2019/061373
§ 371 (c)(1),
(2) Date: Dec. 16, 2020

(87) PCT Pub. No.: WO2019/211436
PCT Pub. Date: Nov. 7, 2019

(65) Prior Publication Data
US 2021/0239578 A1    Aug. 5, 2021

(30) Foreign Application Priority Data

May 4, 2018 (FR) ....................................... 1853904

(51) Int. Cl.
*B01D 45/12* (2006.01)
*G01N 1/22* (2006.01)
*G01N 1/24* (2006.01)

(52) U.S. Cl.
CPC ........... *G01N 1/2211* (2013.01); *B01D 45/12* (2013.01); *G01N 1/24* (2013.01)

(58) Field of Classification Search
CPC ........ G01N 1/2211; G01N 1/24; B01D 45/12; B01D 45/16
(Continued)

(56) References Cited

U.S. PATENT DOCUMENTS 6,251,152 B1   6/2001  Thiele
6,296,764 B1  10/2001  Guirguis et al.
(Continued)

FOREIGN PATENT DOCUMENTS

CN   1813058 A      8/2006
DE   10153898 A1 *  8/2002  ............. A47L 9/104
(Continued)

OTHER PUBLICATIONS

International Search Report from corresponding International Application No. PCT/EP2019/061373, dated Jul. 18, 2019, pp. 1-5, European Patent Office, Rijswijk, The Netherlands.
(Continued)

*Primary Examiner* — Robert R Raevis
(74) *Attorney, Agent, or Firm* — HAUPTMAN HAM, LLP

(57) ABSTRACT

A system for collecting particles having a suctioning device and a chamber for centrifugating and collecting particles. The centrifugation chamber having a guiding edge as well as an air inlet and an air outlet. The device having an assembly including an air suctioning conduit, a member including a guiding and receiving system, at least one guiding edge of the chamber, the member being mobile relative to the conduit between a first position, wherein the at least one guiding edge can be guided and received in the guiding and receiving system and a second position for collecting particles, where the air outlet of the chamber is applied on an end of the conduit.

11 Claims, 4 Drawing Sheets

(58) Field of Classification Search
USPC ........ 96/372, 413, 61, 177; 95/34, 269, 271;
422/533, 548; 73/28.04, 863.21
See application file for complete search history.

(56) References Cited

U.S. PATENT DOCUMENTS

| | | |
|---|---|---|
| 8,051,532 B1 | 11/2011 | Griffith et al. |
| 2006/0144025 A1 | 7/2006 | Vallayer et al. |
| 2008/0076171 A1 | 3/2008 | Hempel et al. |
| 2010/0255484 A1 | 10/2010 | Halverson et al. |
| 2012/0304740 A1 | 12/2012 | Becker |
| 2014/0352268 A1 | 12/2014 | Wilson |

FOREIGN PATENT DOCUMENTS

| | | |
|---|---|---|
| EP | 0927578 A1 | 7/1999 |
| FR | 2905379 A1 | 3/2008 |
| JP | 2000023661 A | 1/2000 |
| WO | 2010049836 A1 | 5/2010 |

OTHER PUBLICATIONS

Written Opinion from corresponding International Application No. PCT/EP2019/061373, pp. 1-5, European Patent Office, Rijswijk, The Netherlands.

Chinese Office Action issued in corresponding Chinese Patent Application No. 201980044370.6, dated Jan. 25, 2024, pp. 1-8.

\* cited by examiner

DEVICE FOR COLLECTING PARTICLES OR MICROORGANISMS

The present application is a National Phase of International Application Number PCT/EP2019/061373, filed May 3, 2019, which claims priority to French Application No. 1853904, filed May 4, 2018.

FIELD

The present invention relates to a device for collecting particles or and/or microorganisms for the purpose of identifying and counting or filtering these particles and/or microorganisms.

BACKGROUND

The identification and counting are important in numerous fields such as the pharmaceutical industry, the agribusiness industry, the medical environment, hygiene services, veterinary services, site surveillance, etc., the dimensions of the particles and microorganisms to be collected could vary from 0.5 µm to several tens of microns.

By document FR-A-2 855 831, a device of this type which comprises a removable centrifugation chamber associated with air suctioning means is known, the chamber comprising an air inlet and an air outlet and forming a container for transporting a liquid sample containing the particles and microorganisms collected.

With such a device, it is the same element which is used for separating and for collecting particles and microorganisms present in the ambient air and for the transport thereof for purpose of analysis. This reduces handling and decreases the risks of contamination of the particles and microorganisms collected. This guarantees that the particles and microorganisms analysed represent 100% of the particles and microorganisms collected.

If this type of device has proved to be interesting, it does not however allow an easy handling of the chamber and involves the user arranging their two hands at each time of handling to position and remove the chamber from its connection with the assembly supporting the suctioning means.

In document EP059583, it has been proposed to use a plurality of chambers of different diameters so as to enable a wide range of suctioning flow rates. It is understood, even then, that the handling of several chambers can prove to be difficult.

Document U.S. Pat. No. 8,051,532 describes a vacuum with a latch mechanism for the removable mounting of a dust container. This mechanism however remains limited to facilitate the handling of the container.

The invention proposes applying a simple and effective solution to the abovementioned problems.

SUMMARY OF THE INVENTION

For this purpose, the present invention relates to a system for collecting particles and/or microorganisms suspended in a gaseous medium comprising a suctioning device and a chamber for centrifugating and for collecting said particles and/or microorganisms:
the centrifugation chamber comprising at least one guiding edge, as well as an air inlet and an air outlet;
the device comprising:
an assembly including an air suctioning conduit and which can comprise suctioning means,
a member including means for guiding and for receiving said at least one guiding edge of said chamber, the member being mobile relative to the conduit between a first position wherein said at least one guiding edge can be guided and received in said guiding and receiving means, and a second position for collecting particles, wherein the air outlet of the centrifugation chamber is applied on an end of the air suctioning conduit.

Thus, according to the invention, the centrifugation chamber can be received in the means for receiving a mobile member which allows, through the translation movement thereof, the application of the outlet of the chamber, the suctioning end of the suctioning conduit of the collection system. It is understood that it is possible to position the chamber with one single hand by first carrying out a positioning of said at least one guiding edge in the receiving means and by then carrying out a movement of the member so as to achieve the sealed junction between the outlet of the chamber and the end of the suctioning conduit.

According to another feature of the invention, the member can comprise a tubular portion mounted sliding around the end of the suctioning conduit and including said receiving means.

Even more specifically, the receiving means can comprise a housing for receiving said at least one guiding edge, the housing being delimited by an edge, for example annular, sized to retain said at least one guiding edge by gravity along the axis of the tubular portion.

The edge which can be annular can be formed at one end of the tubular portion and comprise a passage opening of said at least one guiding edge of the centrifugation chamber.

It will be noted that the guiding edge can be annular, but can also have another shape, such as for example, a rectangular or square shape which would be as suitable for an engagement with the guiding and receiving means. The term "guiding edge" therefore first aims to ensure the indicated function without being limited to a particular shape. However, it will be noted that the annular shape with an outer circular contour of the guiding edge is a shape facilitating the introduction of it in the guiding and receiving means, due to the symmetry of revolution thereof.

In the practical embodiment of the invention, the passage opening allows the introduction of said at least one guiding edge of the chamber in the receiving housing. The translation movement of the member subsequently ensures the fluidic communication of the outlet of the chamber with the inlet of the suctioning conduit.

According to another feature of the invention, a ring is mounted in rotation around said suctioning conduit and blocked in translation on said conduit, said ring being coupled in rotation to said member such that a rotational movement of the ring induces a translation movement of the member between the first receiving position and the second collecting position.

This embodiment allows to simply and rapidly achieve a movement of the member between the first position thereof and the second position thereof. The transformation of the rotational movement of the ring in translation movement of the member can be achieved by producing an outer thread on the member and which engages with a corresponding inner ring thread.

Also according to another feature of the invention, the ring and the mobile member are sized and positioned relative to one another such that the member is in the first position thereof, the passage opening is accessible for the introduction and the exit of said at least one guiding edge of the chamber and that when the member is in the second position thereof, the opening is blocked by the ring.

This embodiment has the advantage of allowing a blocking of the chamber on the collecting device when the member is in the second position thereof subsequently prohibiting the removal of the centrifugation chamber.

The centrifugation chamber can comprise a first truncated portion removably connected to a second portion including the air inlet which is surrounded externally by a cylindrical skirt. The cylindrical skirt allows to protect the air inlet by avoiding the introduction of large particles in the chamber. The removable fixing allows to only conserve the first truncated portion after collection and to block the opening thereof with a cover, thus limiting the bulk volume of the portion to be handled with only the first portion.

The first portion is preferably fixed by screwing on the second portion.

Advantageously, the second portion comprises said at least one guiding edge which surrounds said air outlet. Said at least one guiding edge can comprise an annular collar which extends preferably substantially radially to the axis of the chamber.

The invention will be better understood and other details, features and advantages of the invention will appear upon reading the following description made as a non-limiting example in reference to the appended drawings.

DETAILED DESCRIPTION

Figure 1:
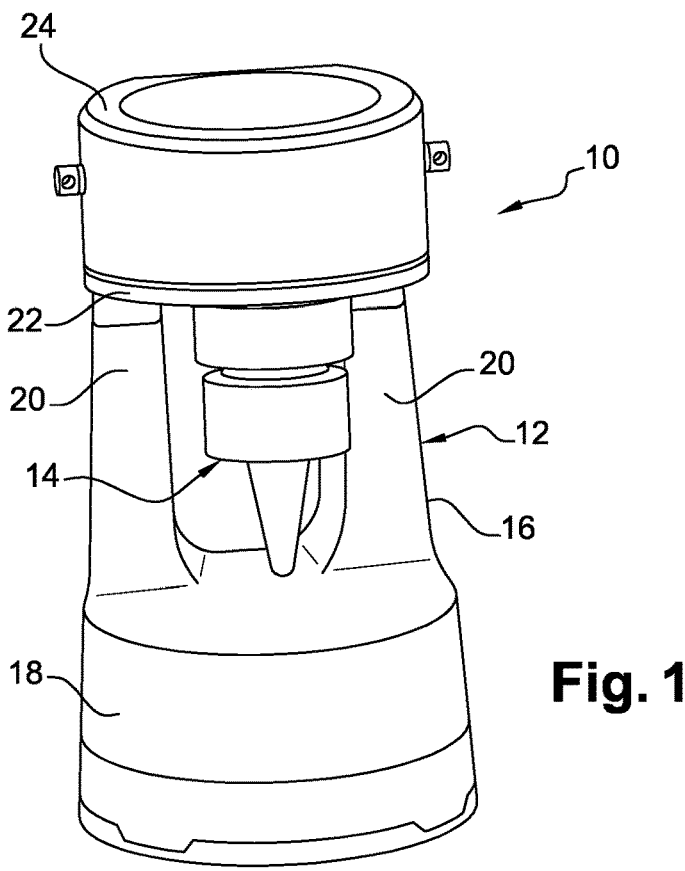
FIG. 1 is a schematic, perspective view of a system according to the invention.
Figure 2:
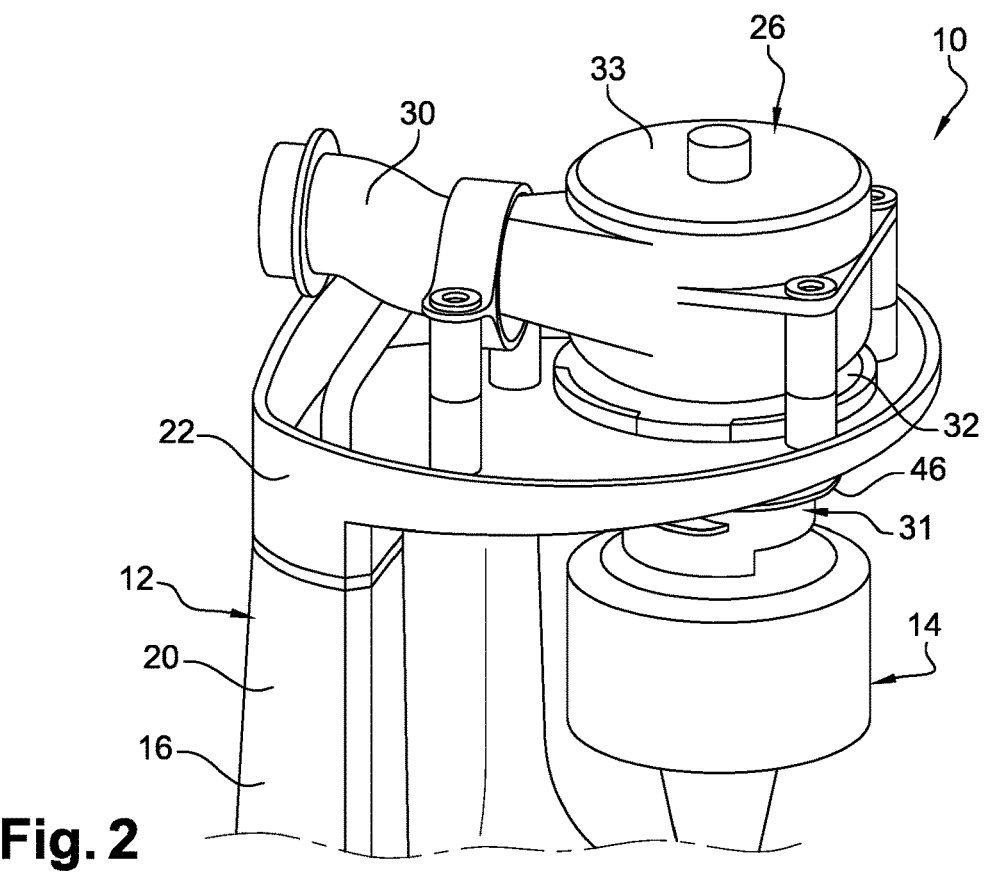
FIG. 2 is a schematic, perspective view and of the top of the system according to the invention, a shroud cap having been removed.

Now, FIG. 1 will be referred to, which represents a system 10 for collecting particles according to the invention comprising a suctioning device 12 and a chamber 14 for centrifugating and collecting particles present in the ambient air, the chamber 14 here being fixed to the device 12.

Figure 5:
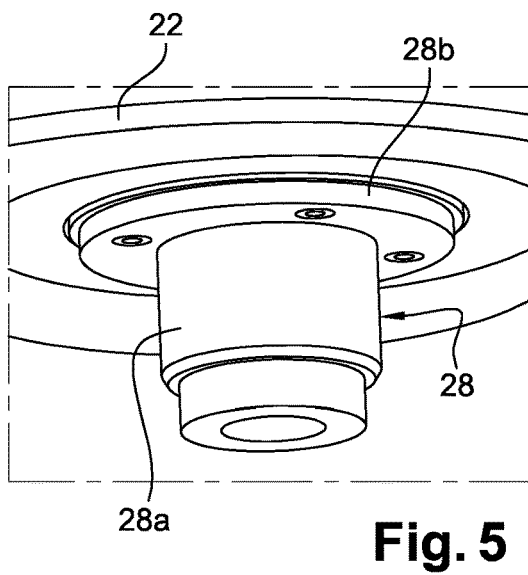
FIG. 5 is a schematic, perspective view of the air suctioning conduit of the system according to the invention.
Figure 6:
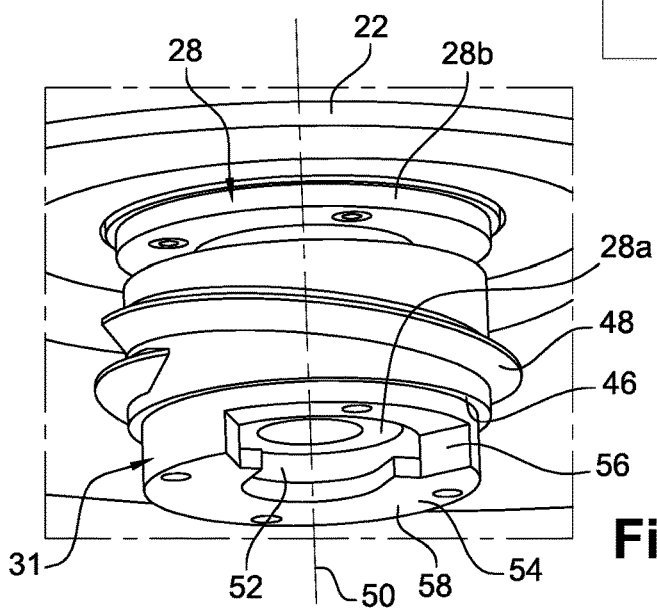
FIG. 6 is a schematic, perspective view of the member for guiding and receiving the chamber.
Figure 7:
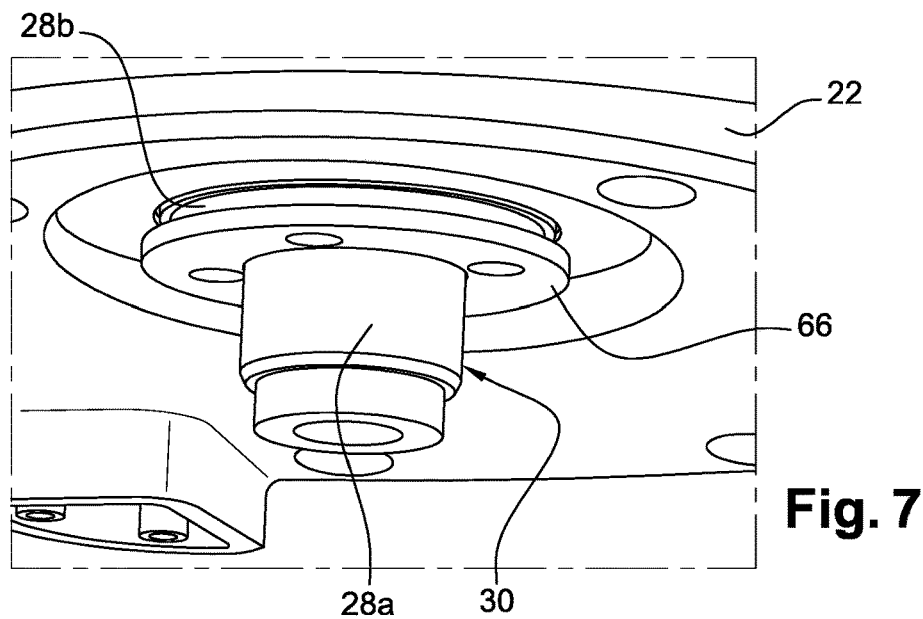
FIGS. 7 to 10 represent different assembly parts for achieving the connection between the suctioning device and the chamber in the scope of a possible embodiment of the invention.

The device 12 comprises an assembly 16 including a support base 18 from which extend two arms 20 for connecting to an upper pad 22 carrying a cap 24 and supporting a suctioning wheel 26 connected upstream to a suctioning conduit 28 (FIG. 5) oriented substantially vertically and downstream to an air outlet conduit 30 to the outside of the system 10. The suctioning wheel 26 is rotated by a motor arranged in the base 18 and which cannot be seen in the figures.

The suctioning device 12 further comprises a mobile member 31 mounted around the suctioning conduit 28. As can be seen in FIGS. 2, 5, and 6 to 10, the air suctioning conduit 28 comprises a first lower portion 28*a* and a second upper portion 28*b* which has an outer diameter greater than the first lower portion 28*a*. The upper end of the suctioning conduit 28 is connected to a radial annular flange 32 which is fixed, in the present case by bolting, on the upper pad 22. It is also noted that the casing 33 of the suctioning wheel 26 is supported by the radial annular flange 32 which is applied on the upper surface of the pad 22, the suctioning conduit 22 being introduced through an orifice of the pad 22 and the radial annular flange 32 ensuring a retaining of the assembly before fixing.

According to the invention, the mobile member 31 comprises means for guiding and receiving a guiding edge of the chamber. Equally, the guiding and receiving means can be designated as a receiver configured so as to guide a guiding edge of the chamber. Before producing a detailed description of the centrifugation and collection chamber 14, it is all the same indicated that this comprises at least one guiding edge 38 as well as an air inlet 40 and an air outlet 42 (FIGS. 11A and 15). More specifically, it comprises a continuous guiding edge 38 which here is an annular collar which surrounds the air outlet 42 thereof. It is understood that the guiding edge 38 could be discontinuous and not extend angularly around the air outlet 42 without this affecting the operation of the invention, as this will emerge in the following evidence.

In the embodiment represented in the figures, the mobile member 31 is formed by a tubular portion 46 carrying on the or the outer surface thereof, a thread 48 extending around the axis 50 of the tubular portion 46. The tubular portion 46 comprises an upper end and a lower end, the latter end comprising the guiding and receiving ends, which include a housing 52 for receiving the edge 38 or guiding collar of the chamber 14 (FIG. 6). As can be more specifically seen in FIGS. 4 and 6, the housing 52 is delimited by an annular edge 54 of the lower end of the tubular portion 46. This annular edge 54 comprises a substantially cylindrical wall portion 56 and a radial annular wall portion 58 with respect to the axis 50 of the tubular portion 46. It is noted that the cylindrical wall portion 56 and the radial annular wall portion 58 do not extend over 360°, but over an angle of about 280° and together delimiting at the level of the free ends thereof, a passage opening for the introduction of the annular collar 38 of the centrifugation and collection chamber 14. Also, the radial annular wall portion 58 is sized such that the annular collar 38 can be retained in the direction of the axis 50 of the tubular portion 46 after receiving of the collar 38 in the receiving housing 52. The radial annular portion 58 internally delimits an opening wherein is mounted the air outlet 42 conduit 41 of the chamber 14.

FIG. 3, as well as FIG. 10, represents a ring 60 mounted around the member 31 and which engages with it such that the rotation of the ring 60 induces a sliding towards the top of the member 31 leading to the air outlet 42 of the chamber 14 being applied and clamped on the lower end of the first portion 28a of the air suctioning conduit 28 to achieve a sealed junction between the chamber 14 and the air suctioning conduit 28. For this, the ring 60 comprises means, such as a thread produced on the inner surface thereof (not represented), engaging with the outer thread 48 of the mobile member 31. The ring 60 which is represented here is a clamping ring which is mounted in rotation around the first portion 28a of the suctioning conduit 28, but is blocked in translation or sliding with respect to the suctioning conduit 28.

Figure 8:
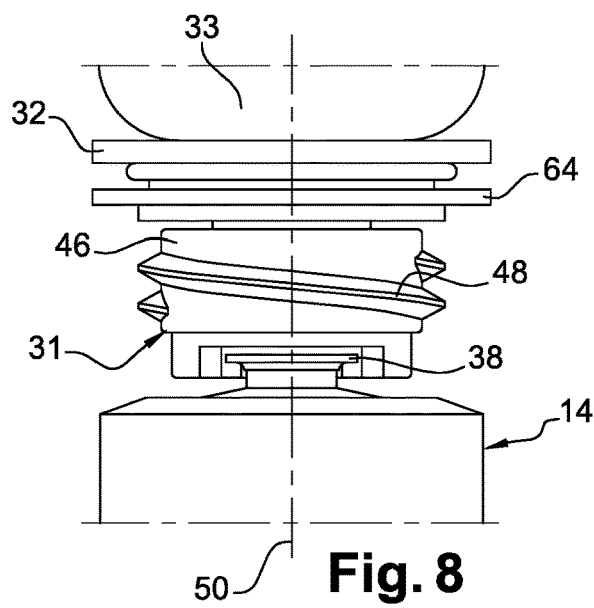
Figure 9:
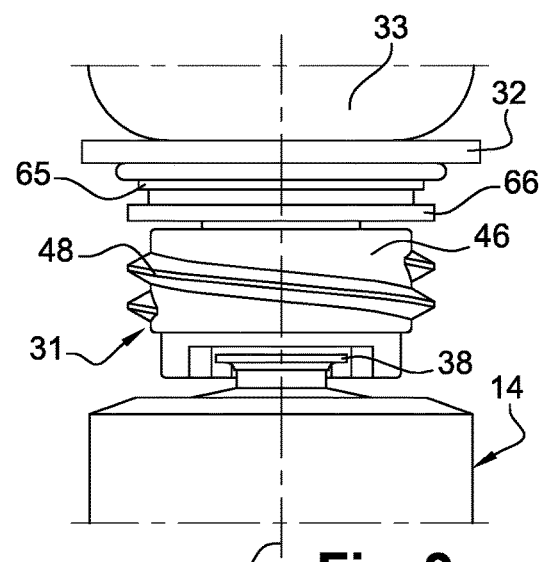
Figure 10:
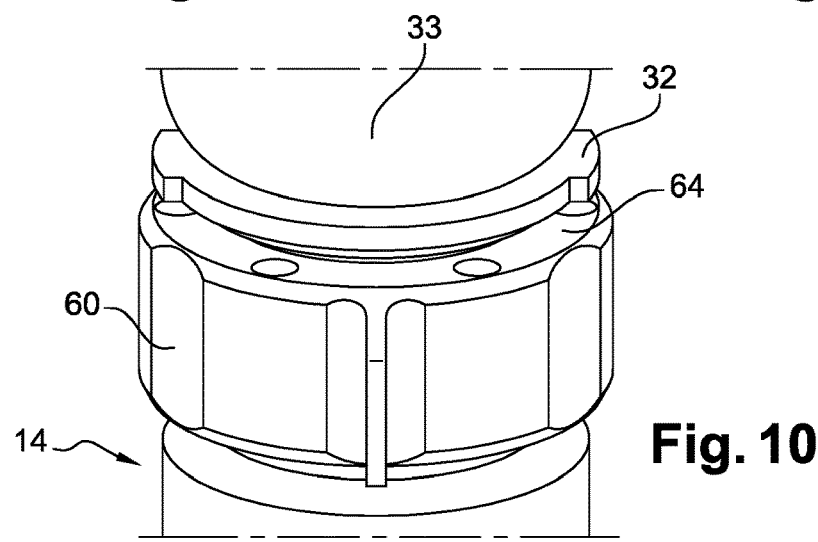
Figure 11A:
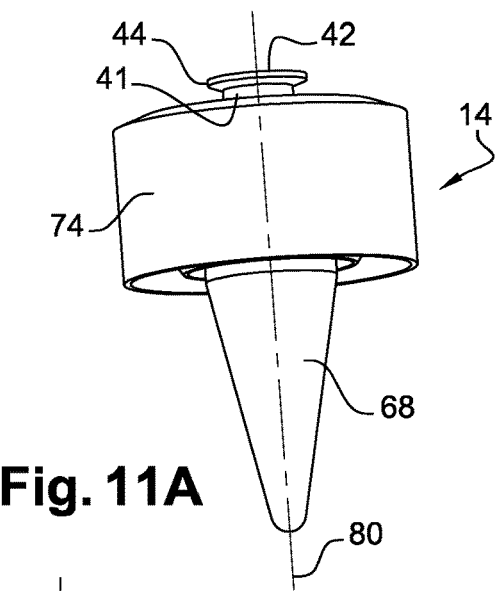
FIGS. 11A and 11B are schematic, perspective views of a centrifugation and collection chamber intended to be used in a device according to the invention.
Figure 11B:
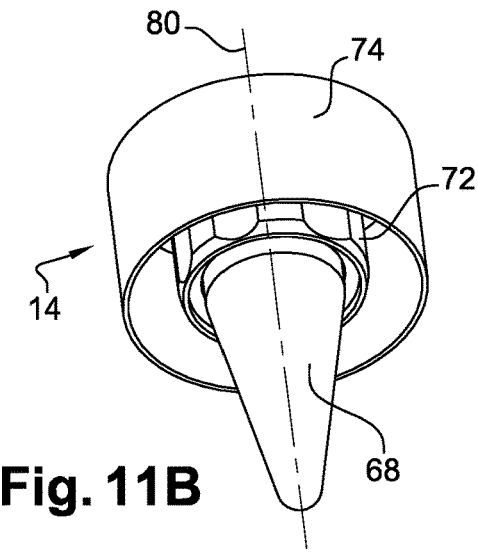
Figure 12:
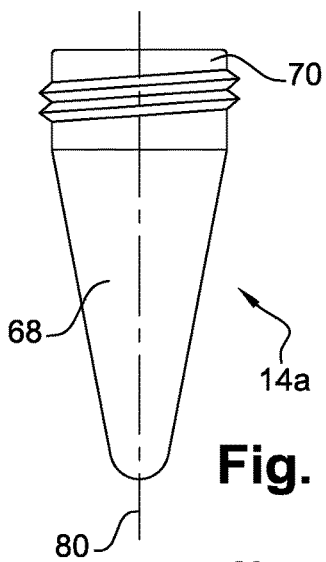
FIG. 12 is a schematic, perspective view of the first portion of the chamber.

FIGS. 8 and 9 represent the different parts allowing to achieve the rotational movement of the ring 60 around the conduit 28 for the purpose of the sliding movement of the member 31. The device 12 according to the invention thus comprises a first ring 64 engaged around the second portion of the suctioning conduit. The first ring 64 is blocked towards the top by a shoulder 65 of the second portion 28b of the suctioning conduit 28 (FIG. 9) and is blocked towards the bottom by a second ring 66 mounted around the first portion 28a of the suctioning conduit 28 (FIG. 8). The first ring 64 is screwed in the radial annular wall forming a shoulder 65 for separating the first portion 28a of the suctioning conduit 28 and of the second portion 28b of the suctioning conduit 28. Thus, the first ring 64 is blocked in translation on the suctioning conduit 28. As can be seen in FIG. 10, the clamping ring 60 is made integral with the first ring 64 by bolting means, for example.

It is therefore clear that the mobile member 31 allows the guiding and the receiving of an edge 38 of the chamber 14 in a first position for receiving said edge in the housing 52 of the member 31. The sliding movement of the member 31 is ensured by the ring 60 which allows to move the member 31 in the second position thereof, wherein the air outlet 42 of the centrifugation chamber 14 is applied on a lower end of the air suctioning conduit 28.

Figure 3:
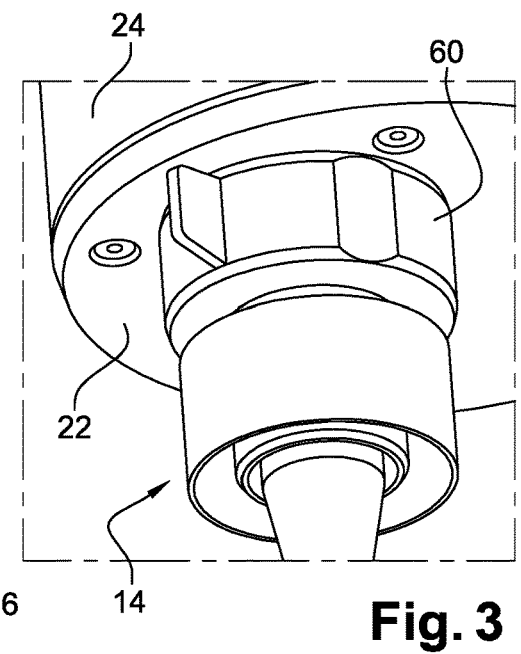
FIG. 3 is a schematic, perspective view of the connection between a centrifugation and collection chamber and a suctioning device.
Figure 4:
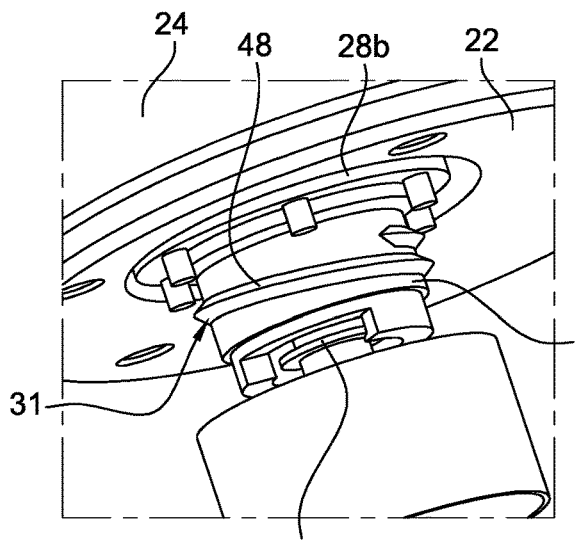
FIG. 4 is a schematic, perspective view similar to FIG. 3, wherein the rotating ring has been removed.

Also, as can be seen in FIG. 3, the ring 60 and the mobile member 31 are sized and positioned relative to one another such that when the member 31 is in the first position thereof, the passage opening is accessible for the introduction and the exit of the collar 38 for guiding the chamber 14 and that when the member 31 is in the second position thereof, the opening is blocked by the ring 60 (FIG. 3).

Figure 13:
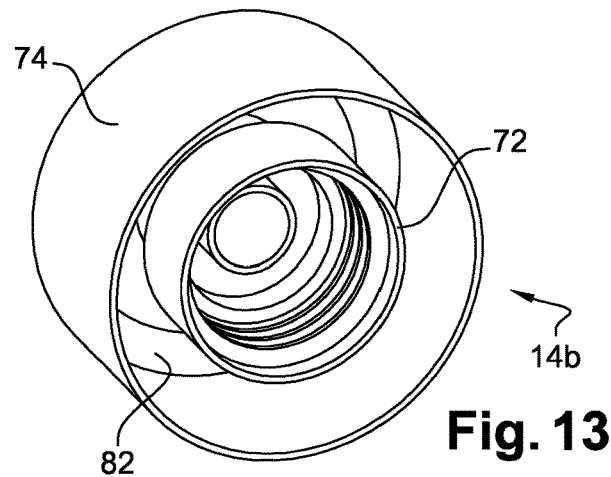
FIG. 13 is a schematic, perspective view of the second portion of the chamber, this second portion being intended to be removably fixed to the first portion represented in FIG. 12.
Figure 14:
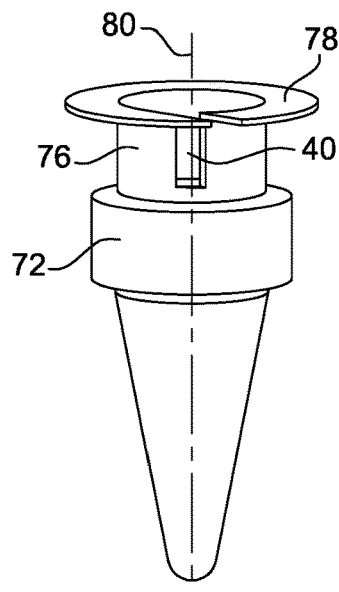
FIGS. 14 and 15 are schematic, perspective views of a chamber wherein the second portion is not totally represented to facilitate the viewing of the features of the chamber.
Figure 15:
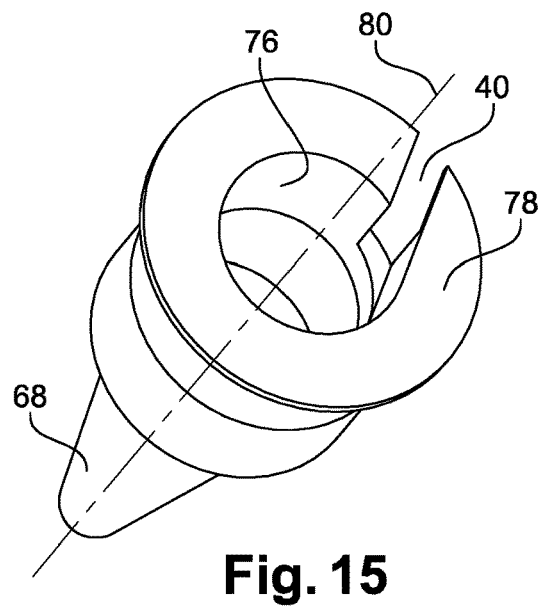

Now, FIGS. 11A, 11B and 12 to 15 will be referred to, which represent a chamber 14 according to the invention. This chamber 14 comprises two separate portions 14a, 14b, namely a first portion 14a (FIG. 12) and a second portion 14b (FIG. 13). The first portion 14a comprises a lower truncated portion 68 connected to an upper cylindrical portion 70 comprising an outer thread or any other means allowing the removable securing to the second portion 14b of the chamber 14. The cross-section of the truncated portion 68 is reduced from the upper cylindrical portion 70 and to the end thereof.

The second portion 14b comprises a first cylindrical portion 72 coaxial to an outer cylindrical skirt 74. The first cylindrical portion 72 comprises an inner thread or any other means allowing the removable securing to the first portion 14a of the chamber 14. The first cylindrical portion 72 is connected to a second cylindrical portion 76 of diameter less than the diameter of the first cylindrical portion 72 and is connected to the opposite of the first cylindrical portion 72 to a radial annular edge 78 with respect to the axis 80 of the chamber 14. An opening 40 is arranged through the second cylindrical portion 76 and of the radial annular edge 78 and forms the air inlet of the chamber 14. The outer cylindrical skirt 74 is connected to a radial annular wall 82 extending radially towards the inside and connected internally to an air outlet conduit 41 carrying at one end, the annular collar 38. The radial annular edge 78 is applied and fixed on the radial wall 82 such that the outlet conduit 41 is coaxial with the axis 80 of the chamber 14.

In operation, the air filled with particles of interest circulates through the air inlet 42 of the second portion 14b of the chamber 14, then is centrifugated in the first portion 14a and rises through the central portion of the cone to exit through the outlet conduit 41. It then flows in the suctioning conduit 28. After the collection operation has been carried out, the centrifugation and collection chamber 14 is removed from the suctioning device, then the first portion 14a of the chamber 14 is separated from the second portion 14b. The first portion 14a of the chamber 14 is then covered by a blocking cover being fixed using the thread of the cylindrical portion 70 thereof.

The invention claimed is:

1. A system for collecting particles and/or microorganisms suspended in a gaseous medium comprising a suctioning device and a chamber for centrifugating and collecting said particles and/or microorganisms:
    the centrifugation chamber comprising at least one guiding edge as well as an air inlet and an air outlet;
    the device comprising:
        an assembly including an air suctioning conduit, and
        a member including a guiding and receiving system for guiding and receiving the at least one guiding edge of the centrifugation chamber, the member being mobile relative to the air suctioning conduit between a first position wherein the at least one guiding edge can be guided and received in the guiding and receiving system and a second position for collecting particles, wherein the air outlet of the centrifugation chamber is applied on an end of the air suctioning conduit;
    wherein the system further comprises a ring mounted around the air suctioning conduit and blocked in translation on the air suctioning conduit, the ring being coupled in rotation to the member such that a rotational movement of the ring induces a translation movement of the member between the first receiving position and the second collecting position.

2. The system according to claim 1, wherein the member comprises a tubular portion mounted sliding around the suctioning conduit and including the guiding and receiving system.

3. The system according to claim 2, wherein the member comprises an edge that is sized to retain the at least one guiding edge by gravity along the axis of the tubular portion.

4. The system according to claim 3, wherein the edge is formed at one end of the tubular portion and comprises a passage opening of said at least one guiding edge of the centrifugation chamber.

5. The system according to claim 4, wherein the ring and the member are sized and positioned, one relative to the other such that when the member is in the first position thereof, the passage opening is accessible for an introduction and an exit of the at least one guiding edge of the centrifugation chamber and that when the member is in the second position thereof, the passage opening is blocked by the ring.

6. The system according to claim 1, wherein said member comprises an outer thread, and the ring mounted around the air suctioning conduit comprises an inner thread, said outer thread engaging with the inner thread.

7. The system according to claim 1, wherein the system comprises a suctioning system carried by the assembly.

8. The system according to claim 1, wherein the centrifugation chamber comprises a first truncated portion removably connected to a second portion, the second portion including the air inlet which is surrounded externally by a cylindrical skirt.

9. The system according to claim 8, wherein said first truncated portion is fixed by screwing on the second portion.

10. The system according to claim 8, wherein the second portion comprises the at least one guiding edge which surrounds the air outlet.

11. The system according to claim 1, wherein the at least one guiding edge comprises an annular collar.

* * * * *